April 29, 1930. D. T. IGOU 1,756,750
CANDY CUTTING MACHINE
Filed June 18, 1928
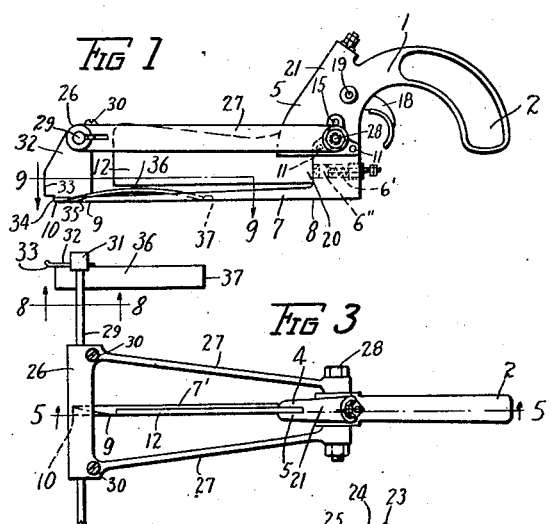
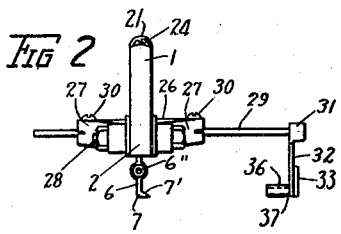
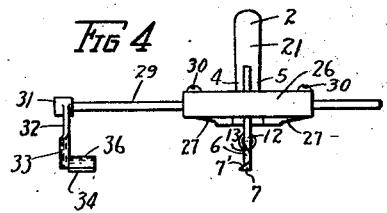
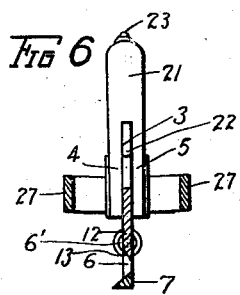
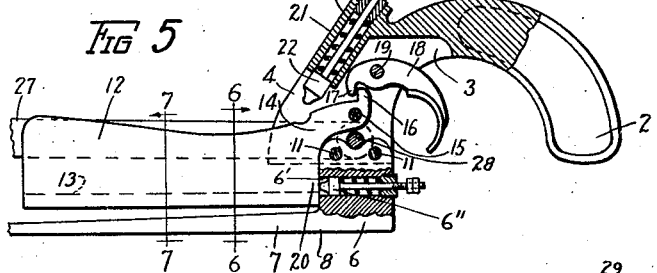
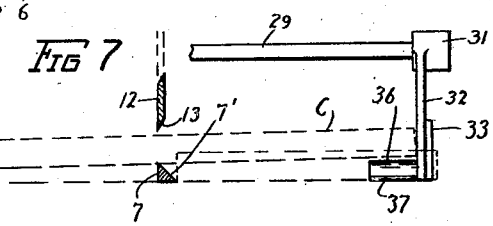
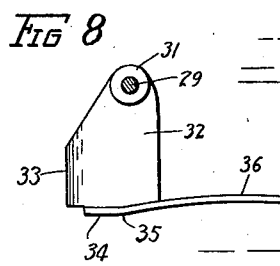
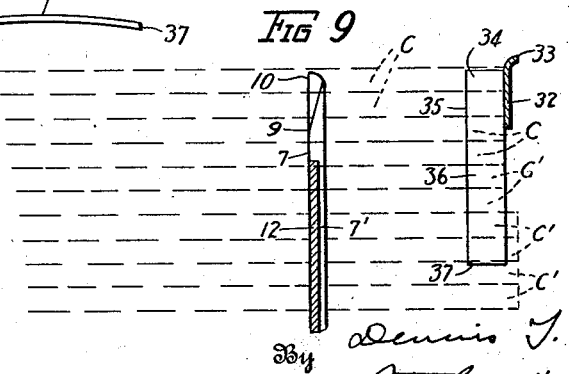
Inventor
Dennis T. Igou
By Staley & Welch
Attorneys Patented Apr. 29, 1930

1,756,750

UNITED STATES PATENT OFFICE

DENNIS T. IGOU, OF SPRINGFIELD, OHIO

CANDY-CUTTING MACHINE

Application filed June 18, 1928. Serial No. 286,179.

This invention relates to improvements in devices for cutting candy; it more particularly relates to that class of cutters intended for the cutting of hard stick candy of the manually operated type.

One of the objects of the invention is to provide a candy-cutter of simple and inexpensive construction.

Another object is to provide a tool of improved design so that the percentage of broken sticks is reduced, whereby the time involved in cutting is also reduced.

A further object of the invention is to provide for the more ready insertion of the cutting mechanism into cutting position with relation to the rods of candy and to maintain it in that position to insure uniform severing of the rods and consequent uniformity in the length of the severed sticks.

In the process of making stick candy, particularly the kinds for which my improved cutter is especially adapted, the hot batch is drawn or spun into comparatively long rods or lengths and allowed to cool, after which it is cut into sticks of any desired length. The cutting operation, is, in fact, merely the striking of a sharp blow; however, it will be evident that the same brittle property that favors easy and rapid cutting, may also produce a large percentage of broken sticks. To permit the cutting operation to proceed at its highest possible speed, and to reduce the percentage of breakage, I have devised the tool shown in the accompanying drawing, and of which the following is a description and specification therefor.

In the accompanying drawings:

Fig. 1 is a side elevation of the improved device.

Fig. 2 is a rear elevation.

Fig. 3 is a plan view.

Fig. 4 is a front elevation.

Fig. 5 is an enlarged longitudinal section on the line 5—5 of Fig. 3.

Fig. 6 is an enlarged vertical section on the line 6—6 of Fig. 5.

Fig. 7 is an enlarged vertical section on the line 7—7 of Fig. 5.

Fig. 8 is an enlarged vertical section on the line 8—8 of Fig. 3.

Fig. 9 is an enlarged longitudinal section on the line 9—9 of Fig. 1.

Referring to the drawings, 1 is a frame member having a curved grip or handle 2. The forward and lower portion of the frame 1 is divided, having a slot 3 formed by the jaws 4 and 5, and into this slot 3 is inserted the shank 6 of a lower cutting edge or anvil 7. The anvil 7 is of triangular cross-section, diminishing in area from a point 8 to a point 9, from which latter point it is tapered to a thin edge 10, to more readily slip under the candy to be cut.

From the point 8 rearwardly the cross-section is rectangular, while from the point 10, the side opposite the diagonal side 7' is flat and straight. The shank 6 is rigidly secured in the slot 3 between the jaws 4 and 5 by screws 11, 11. A knife 12, preferably somewhat shorter than the triangular portion of the anvil 7, and having a beveled edge 13 on that side corresponding to the diagonal side 7' of the anvil 7, co-acts with, but does not meet, as regards the cutting edges of either, the anvil 7; an upwardly and rearwardly extending portion 14 is adapted to be inserted and guided within the slot 3, and has passed through it the pivot screw 15. At the rear end of the extension 14 is a lug 16 extending upwardly and coacting with a lug 17 on a trigger 18, which is pivoted at 19.

The shank 6 of the anvil has a chamber 6' in which is located a spring-pressed plunger 6'' similar to the plunger 22 which cooperates with the heel of the knife to cushion the final dropping movement of the same.

In an obliquely extending boss 21 integral with the main frame 1, is a plunger 22 having a reduced stem 23 aligned by means of a perforated screw plug 24, and having a coiled spring 25 interposed.

A gage-holder 26 with arms 27 is rigidly secured to the main frame 1 by a bolt 28, and through the gage-holder a rod 29 is inserted and held at any desired position by means of clamping screws 30, 30. At one end of the rod 29 is fixed a gage-head 31, having a downwardly extending portion 32 with a curved front edge 33. At the bottom of the portion 32 and at right-angles thereto is a ledge, the forward portion 34 of which is horizontally disposed and the rear portion of which, beginning with the point 35, is bent so that its surface coincides with the arc of a circle, having a high point at 36 and having its end 37 in about the same horizontal plane as the forward portion 34.

The operation is as follows: A plurality of rods of the cooled candy are arranged on the table, and the knife 12 is raised by a pull on the trigger 18. The anvil 7 is slipped under a number of the rods, the ends contacting with the gage, and at such distance as will bring the curved portion 36 under the ends of the nearest rods. This will result in the near rods assuming an angular position with the table since they rest partly on the table and on the anvil, and the vertical distance from the table to the end of the rod at the gage end is substantially the height of the curved portion 36. This is best shown in Fig. 7, the candy rod C shown in broken lines being represented as having assumed the angular position just described.

When the knife is dropped, the severed sticks, indicated at C', Fig. 7 and Fig. 9, now have their gage-ends resting on the ledge at 36, while their inner ends drop to the diagonal side 7' of the anvil 7, with a further easy drop to the table, and as the tool is advanced toward the uncut candy, these severed sticks roll off the rear slope of the ledge at the end 37. The ends of the rods C from which sticks have been cut drop to the table, as indicated in Fig. 7, and since the knife 12 and the anvil 7 both have, on this side, straight, smooth sides, it is possible to advance the cutter along the line of cut without disarranging the candy or holding the tool at an angle.

The ledge which projects inwardly from the gage member acts to check the fall of the severed sticks and thus obviates breaking of the sticks.

In ordinary operation, the device is advanced rapidly along the line of cut, while the trigger is given short, sharp pulls. If a more forcible blow is desired, a sharper pull on the trigger will raise the knife so much higher that it will strike the plunger 22, and compress the spring 25. When the trigger is released, the force of gravity is aided by the power stored up in the spring, and a much sharper blow is given.

Having thus described my invention, I claim:

1. In a device of the character described, a support freely movable over a table, a horizontally arranged anvil carried by said support, a knife cooperating with said anvil pivoted to said support, a gage member carried by said support at the side of the forward end of said anvil, said gage member having a ledge connected therewith and extending inwardly and rearwardly to support the outer ends of the severed candy sticks.

2. In a device of the character described, a support, a horizontally arranged anvil carried by said support, a knife cooperating with said anvil pivoted to said support, a gage member carried by said support at the side of the forward end of said anvil, said gage member having a ledge extending inwardly and rearwardly, said ledge being inclined upwardly in a rearward direction and thence downwardly.

3. In a device of the character described, a support, a horizontally arranged anvil carried by said support, a knife cooperating with said anvil pivoted to said support, a gage member carried by said support at the side of the forward end of said anvil, said gage member having a ledge extending rearwardly, the forward portion of said ledge being in a horizontal plane and the remainder of said ledge being formed on the arc of a circle.

4. In a device of the character described, a support freely movable over a table, a horizontally arranged anvil projecting forwardly from said support, a knife pivoted to said support and cooperating with said anvil, a gage member carried by said support and located at the side of and wholly beyond the forward portion of said knife, said gage member having a ledge connected therewith and projecting inwardly and rearwardly therefrom to break the fall of candy sticks the furthest side of said anvil from said gage member and the corresponding side of said knife having straight vertically aligned faces.

5. In a device of the character described, a support, a horizontally arranged anvil connected with said support, a gravity operated knife pivotally mounted on said support cooperating with said anvil, and a resilient impetus member mounted on said support in the path of the back of said knife arranged to be put under tension by the final upward movement only of said knife.

6. In a candy cutter, a support freely movable over a table, a knife pivoted to said support, a horizontally-arranged anvil on said support cooperating with said knife, the outer end of said anvil being extended beyond the free end of said knife and tapered downwardly toward its end so as to be freely inserted under sticks of candy placed on a table by bodily movement of said support, and a gage located at one side of and wholly beyond the free end of said knife.

7. In a candy cutter, a mechanism adapted to be freely movable as a unit over a table, consisting of a support, a horizontally arranged anvil carried by said support, and a knife pivoted to said support cooperating with said anvil to sever sticks of predetermined length from rods of candy placed on said table, said anvil being formed so as to be freely movable under said rods at right angles to the length thereof, said anvil and knife both having straight aligned faces on those sides thereof adjacent those rods of candy from which sticks have been severed whereby the ends of such rods will form guides for the anvil as it is moved under the uncut rods.

8. In a candy cutter, a mechanism adapted to be freely movable as a unit over a table, consisting of a support, a horizontally arranged anvil carried by said support, a knife pivoted to said support cooperating with said anvil to sever sticks of predetermined length from rods of candy placed on said table, and a gage member carried by said support in spaced relation with said knife and located wholly beyond the free end thereof, said anvil being formed so as to be freely movable under said rods at right angles to the length thereof, said anvil and knife both having straight aligned faces on those sides thereof adjacent those rods of candy from which sticks have been severed, whereby the gage and the ends of said rods form guides for the anvil as it is moved under the uncut rods.

9. In a candy cutter, a support, a horizontally-arranged anvil projecting from said support, a knife pivoted to said support and cooperating with said anvil, and a gage member carried by said support in spaced relation with said knife and located wholly beyond the free end of said knife.

In testimony whereof, I have hereunto set my hand this 14th day of June, 1928.

DENNIS T. IGOU.